United States Patent
Bezbaruah et al.

(10) Patent No.: US 9,223,661 B1
(45) Date of Patent: *Dec. 29, 2015

(54) METHOD AND APPARATUS FOR AUTOMATICALLY ARCHIVING DATA ITEMS FROM BACKUP STORAGE

(75) Inventors: Angshuman Bezbaruah, Pune (IN); Ankur Panchbudhe, Pune (IN); Srineet Sridharan, Maharashtra (IN); Niels S. van Ingen, Cedar Hill, TX (US)

(73) Assignee: Symantec Corporation, Mountain View, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/567,614

(22) Filed: Aug. 6, 2012

Related U.S. Application Data

(63) Continuation of application No. 12/191,785, filed on Aug. 14, 2008, now Pat. No. 8,239,348.

(51) Int. Cl.
  *G06F 7/00* (2006.01)
  *G06F 17/00* (2006.01)
  *G06F 11/14* (2006.01)

(52) U.S. Cl.
  CPC .................. *G06F 11/1469* (2013.01)

(58) Field of Classification Search
  CPC ............ G06F 11/1402; G06F 11/1448; G06F 11/1458; G06F 11/1469
  See application file for complete search history.

(56) References Cited

U.S. PATENT DOCUMENTS

| | | | |
|---|---|---|---|
| 5,644,766 A * | 7/1997 | Coy et al. ............................... | 1/1 |
| 5,926,836 A * | 7/1999 | Blumenau ...................... | 711/162 |
| 5,953,729 A * | 9/1999 | Cabrera et al. ......................... | 1/1 |
| 6,446,175 B1 * | 9/2002 | West et al. ..................... | 711/162 |
| 6,510,432 B1 * | 1/2003 | Doyle .................................. | 1/1 |
| 7,558,928 B1 * | 7/2009 | DeVos .......................... | 711/162 |
| 7,627,727 B1 * | 12/2009 | Kekre et al. .................... | 711/162 |
| 7,657,582 B1 * | 2/2010 | Cram et al. ..................... | 707/640 |
| 8,402,001 B1 * | 3/2013 | Tovo .............................. | 707/682 |
| 8,527,468 B1 * | 9/2013 | Crafford et al. ............... | 707/662 |
| 2002/0123999 A1 * | 9/2002 | Bankert et al. .................. | 707/10 |
| 2003/0046313 A1 * | 3/2003 | Leung et al. ................... | 707/204 |
| 2003/0126247 A1 * | 7/2003 | Strasser et al. ................ | 709/223 |
| 2003/0200275 A1 * | 10/2003 | Hirabayashi et al. .......... | 709/214 |
| 2003/0212687 A1 * | 11/2003 | Gonos .......................... | 707/100 |
| 2004/0139128 A1 * | 7/2004 | Becker et al. .................. | 707/204 |
| 2004/0230596 A1 * | 11/2004 | Veitch et al. ................... | 707/101 |
| 2005/0015662 A1 * | 1/2005 | Scanlan ........................... | 714/13 |
| 2005/0021524 A1 * | 1/2005 | Oliver ........................... | 707/100 |
| 2005/0021566 A1 * | 1/2005 | Mu ................................. | 707/200 |
| 2005/0066190 A1 * | 3/2005 | Martin ........................... | 713/200 |
| 2005/0108302 A1 * | 5/2005 | Rand et al. ..................... | 707/204 |
| 2005/0123999 A1 * | 6/2005 | Valdes et al. ................... | 435/7.1 |

(Continued)

FOREIGN PATENT DOCUMENTS

| EP | 614150 A2 * | 9/1994 |
|---|---|---|
| EP | 1738260 B1 * | 2/2010 |

(Continued)

*Primary Examiner* — Augustine K Obisesan

(74) *Attorney, Agent, or Firm* — Campbell Stephenson LLP

(57) ABSTRACT

A method and apparatus for automatically archiving data items from backup storage without having to first restore the data items is provided. In one embodiment, the method comprises processing at least one data item in backup storage using a mapping, wherein the mapping indicates at least one location of the at least one data item and ingesting the at least one data item into an archive database.

17 Claims, 3 Drawing Sheets

(56) References Cited

U.S. PATENT DOCUMENTS

| | | | |
|---|---|---|---|
| 2005/0144189 A1* | 6/2005 | Edwards et al. | 707/102 |
| 2005/0149584 A1* | 7/2005 | Bourbonnais et al. | 707/204 |
| 2006/0173920 A1* | 8/2006 | Adler et al. | 707/104.1 |
| 2007/0180000 A1* | 8/2007 | Mine et al. | 707/204 |
| 2007/0271517 A1* | 11/2007 | Finkelman et al. | 715/742 |
| 2007/0276886 A1* | 11/2007 | Ishikawa et al. | 707/204 |
| 2008/0201318 A1* | 8/2008 | McNew | 707/5 |
| 2009/0028434 A1* | 1/2009 | Vanhoucke et al. | 382/182 |
| 2009/0164409 A1* | 6/2009 | Mukherjee | 707/1 |
| 2011/0093471 A1 | 4/2011 | Brockway et al. | 707/747 |

FOREIGN PATENT DOCUMENTS

| | | | |
|---|---|---|---|
| WO | WO 0225499 A1 * | 3/2002 | |
| WO | WO 2004047078 A2 * | 6/2004 | |
| WO | WO 2007002397 A2 * | 1/2007 | |

* cited by examiner

METHOD AND APPARATUS FOR AUTOMATICALLY ARCHIVING DATA ITEMS FROM BACKUP STORAGE

CROSS-REFERENCE TO RELATED APPLICATIONS

This application is a continuation of U.S. patent application Ser. No. 12/191,785, entitled "METHOD AND APPARATUS FOR AUTOMATICALLY ARCHIVING DATA ITEMS FROM BACKUP STORAGE" filed Aug. 14, 2008 now U.S. Pat. No. 8,239,348 and naming Angshuman Bezbaruah, Ankur Panchbudhe, Srineet Sridharan, and Niels S. van Ingen as the inventors. This application is assigned to Symantec Corporation, the assignee of the present invention, and is hereby incorporated by reference in its entirety and for all purposes as if completely and fully set forth herein.

BACKGROUND

1. Field of the Invention

Embodiments of the present invention generally relate to data protection and archival systems and, more particularly, to a method and apparatus for archiving data items from backup storage without using an application resource to first restore the data items.

2. Description of the Related Art

In a typical computing environment, various data items (e.g., emails, word documents, spreadsheets and/or the like) are backed up to one or more storage device (e.g., magnetic tape drives) on a regular basis. The backup may be performed to store and/or protect important, critical data. The data items may be backed up and organized in a proprietary format as backup images. Such backup images, however, are ill-suited for data discovery and/or compliance with various laws and/or regulations. For example, backup images do not index the data items or otherwise facilitate quick retrieval of stored data, which is an essential requirement for efficient legal discovery. Furthermore, backups are more data protection oriented and have traditionally been performed on magnetic tape storage media. Unfortunately, the magnetic tape media does not lend itself to be easily indexed, searched and analyzed based on content.

Archival software may be used for legal discovery (e.g., E-discovery) and/or legal compliance. Archival software perform an indexing process (e.g., Intelligent Indexing) on the data items and provide additional functionality by integrating with various tools, such as case management tools, analytics tools and/or the like. Hence, the archival software improves E-discovery and legal compliance. On the other hand, older (historical) data has been resident in backup tapes for a considerable period of time (e.g., before the deployment of archival solutions in organizations). Litigation (e.g., current, pending and/or the like) may require that the historical data be migrated to disk based archives and be subject to indexing, searching and or advanced analysis. Such migrations may be performed in the event of litigation, knowledge of pending litigation and/or as part of proactive record management. In order to meet the demands of current/future litigation or legal compliance, various organizations need to migrate the data items in the backup images to an archive.

Traditionally, such a migration requires setting up an application resource (e.g., application server such as MICROSOFT Exchange server) to facilitate the data migration from a backup image to an archive. For example, an administrator must configure an Exchange server and provision data storage to restore emails from a mailbox backup or complete Exchange Database images from an aggregate image backup. Then, the administrator uses the archival software to archive the mails from the newly provisioned Exchange server. The organization must also use a specific version of the application resource to perform the restoration process (e.g., restoring from an Exchange 5.0 or 5.5 backup image). The archival software uses the appropriate MAPI function calls to extract individual emails from a message store located in the data storage. As a result, such a two-step process consumes a significant amount of time, money and other resources to migrate the data items from the backup image to the archive. The above mentioned process of archiving the data items from the backup image is inefficient and costly because it needs to first restore the data items and then, archive the data items.

Therefore, there is a need in the art for a method and apparatus for efficiently and automatically archiving data items from backup storage without using an application resource to first restore the data items.

SUMMARY OF THE INVENTION

Embodiments of the present invention comprise a method and apparatus for automatically archiving data items from a backup storage. In one embodiment, a method for automatically archiving data items from backup storage without using an application resource to first restore the data items, comprising processing at least one data item in backup storage using a mapping, wherein the mapping indicates at least one location of the at least one data item and ingesting the at least one data item into an archive database.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
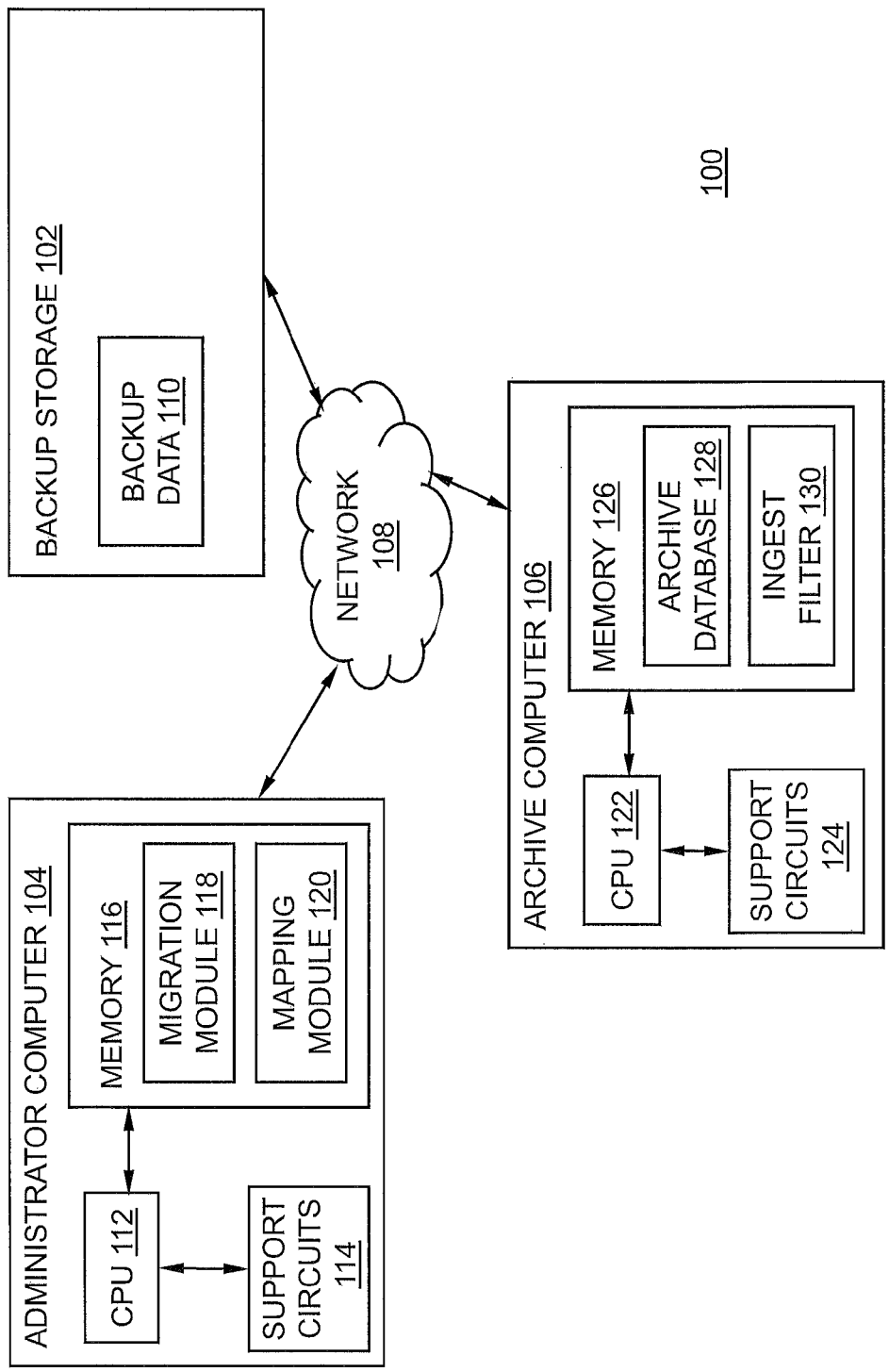
FIG. 1 is a block diagram of a system for automatically archiving data items from a backup storage in accordance with one or more embodiments of the present invention.

FIG. 1 is a block diagram of a system 100 for automatically archiving data items from backup storage according to one embodiment. The system 100 comprises a backup storage 102, an administrator computer 104 and an archive computer 106 where each is coupled to each other through a network 108.

The backup storage 102 is any type of storage device that facilitates data storage and access, such as a magnetic tape drive. According to various embodiments, the backup storage 102 includes backup data 110, which may be a backup of data used by a computer network and initiated by the administrator computer 104. In one embodiment, the backup data 110 (e.g., a mailbox backup (e.g., a brick-level backup), a file-level backup, an aggregate data backup (e.g., a SharePoint Image, an Exchange Database Image and/or the like) includes various types of data items (e.g., emails, journal entries, contacts, notes, web documents, word documents, spreadsheets and/or the like).

The administrator computer 104 is any type of computing device (e.g., laptop, desktop, Personal Digital Assistant (PDA)), such as those generally known in the art. The administrator computer 104 includes a Central Processing Unit (CPU) 112, various support circuits 114, and a memory 116. The CPU 112 may comprise one or more commercially available microprocessors or microcontrollers that facilitate data processing and storage. The support circuits 114 facilitate the operation of the CPU 112 and include one or more clock circuits, power supplies, cache, input/output circuits, and the like. The memory 116 comprises at least one of Read Only Memory (ROM), Random Access Memory (RAM), disk drive storage, optical storage, removable storage, and the like. The memory 116 includes a migration module 118 and a mapping module 120.

The archive computer 106 is any type of computing device (e.g., laptop, desktop, Personal Digital Assistant (PDA)), such as those generally known in the art. The archive computer 106 includes a Central Processing Unit (CPU) 122, various support circuits 124, and a memory 126. The CPU 122 may comprise one or more commercially available microprocessors or microcontrollers that facilitate data processing and storage. The support circuits 124 facilitate the operation of the CPU 122 and include one or more clock circuits, power supplies, cache, input/output circuits, and the like. The memory 126 comprises at least one of Read Only Memory (ROM), Random Access Memory (RAM), disk drive storage, optical storage, removable storage and/or the like. The memory 126 includes an archive database 128 and an ingest filter 130.

The network 108 comprises a communication system that connects a computer system by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure such as Ethernet, WiFi, WiMax, General Packet Radio Service (GPRS), and the like.

Generally, the backup data 110 stores one or more data items of various types (e.g., emails, word documents, aggregate data types, spreadsheets and/or the like). In one embodiment, the backup data 110 may include one or more backup files (i.e., a backup image, such as a full backup image, an incremental backup image, a synthetic backup image and/or the like) generated by enterprise backup software (e.g., SYMANTEC NetBackup products, SYMANTEC BackupExec products and/or the like) to represent a storage state of a computing environment according to one or more embodiments. Furthermore, the backup files may be organized in a proprietary format in which the enterprise backup software is used to identify various backups within the backup files, such as database-level backups, mailbox-level backups, volume-level backups and/or the like.

In one embodiment, the backup data 110 may include a mailbox backup (e.g., Brick-Level mailbox backup for MICROSOFT Exchange) or a file-level backup. In another embodiment, the backup data 110 may also include an aggregate data backup (e.g., a database-level backup), such as MICROSOFT Exchange Database (i.e., Information Store) Backup, MICROSOFT SharePoint Database backup and/or the like. In yet another embodiment, the backup data 110 may include a volume-level backup, such as VMWARE Virtual Machine Disk backup, MICROSOFT Virtual Hard Drive backup, a snapshot, a hard disk/partition backup, an image backup and/or the like. As such, the backup data 110 may include one or more files of various types for encapsulating and representing a volume, an image, a hard disk, a virtual machine/drive and/or a backup in a proprietary format. Accordingly, such files may include virtual machine files (e.g., .VHD, .VMDK, .VMX and/or the like), backup files (e.g., .BKF, .V2I, .GHO and/or the like) and/or disk files (e.g., .IMG, .VCD, .ISO and/or the like).

Moreover, the backup data 110 may include historical data or a data backup taken before the deployment of the archival software within the computing environment. For example, the backup data 110 may include backup images that were generated before the proliferation of the archival software. As such, the archival software cannot extract individual data items (e.g., files and/or emails) from the backup images. Hence, the archival solution is unable to provide a solution for migrating one or more data items from the backup images into an archival repository without having to first restore the one or more data items to the application server. According to one or more embodiment, the migration module 118 cooperates with the archival software to accomplish such a migration as described further below.

According to various embodiments of the present invention, the migration module 118 includes software code that is configured to automatically archive the data items stored in the backup storage 102. In one embodiment, the migration module 118 may extract the data items from the backup data 110 and subsequently, ingest the data items into the archive database 128 without using an application resource (e.g., an applications server) to restore the data items. In one embodiment, the migration module 118 extracts the data items based upon various criteria (e.g., type, content, size and/or the like). In one embodiment, the migration module 118 utilizes a mapping of the data items to extract the data items from the backup data 110 as explained further below.

According to one or more embodiments, the mapping module 120 maps the one or more data items to locations within the backup storage 102 (e.g., addresses of data blocks within the backup data 110). In one embodiment, the mapping module 120 generates a mapping that indicates locations of the one or more data items within the backup data 110. Such a mapping facilitates the extraction of the one or more data items from the backup data 110 by the migration module 118 as explained below. In one embodiment, the mapping module 120 utilizes one or more known mapping techniques (e.g., SYMANTEC BackupExec Granular Restore Technology (GRT), VERITAS Mapping Service (VxMS) and/or the like) to determine the locations of the one or more data items, which are based on the organization of the one or more data items within the backup data 110 (i.e., based on the type of backup and/or format of the one or more data items that form the backup data 110. In one embodiment, the locations of the one or more data items may be created during a backup process that stores the backup data 110 (e.g., VERITAS NetBackup FlashBackup). In another embodiment, the locations of the one or more data items may be discovered during a restore process (e.g., SYMANTEC BackupExec Granular Restore Technology). Furthermore, the mapping may be communicated to the archive computer 106 to provide additional information for archiving the data items.

For example, the mapping module 120 uses a known mapping technique for a MICROSOFT Exchange Database backup to identify individual emails based on the format of the database files (e.g., an .EDB file, log files, an .STM file and/or the like). Subsequently, the mapping module 120 generates a mapping to indicate locations of the individual emails within the backup image (e.g., the backup data 110 serialized on magnetic tape). The mapping module 120 may generate the mapping using an implementation of a Data Storage Engine Application Programming Interface (API) for accessing the individual emails within the backup image.

According to one or more embodiments of the present invention, the archive database 128 cooperates with archival software (e.g., SYMANTEC Enterprise Vault) to maintain content that includes the migrated data items from the backup storage 102 (e.g., magnetic tape drives). Generally, the archive database 128 is a searchable repository from which unstructured data is retrieved for various purposes (e.g., discovery, legal compliance, case/record management, and/or the like). In addition, various software products (e.g., enterprise content management software, such as DOCUMENTUM Content Server, IBM DB2 Records Manager and/or the like) operate with the archival software to organize and retain unstructured documents, emails and other various data items from within a computing environment in the archive database 128.

The ingest filter 130 may include software code for generating an ingest interface for archiving the data items. In one embodiment, the interface includes definitions of various functions for ingesting the data items into the archive database 128. Once archived, the data items are indexed and easily retrievable for use by the various software products. According to one or more embodiments, the ingest filter 130 may include an implementation of an Application Programming Interface (API) associated with various software products, such as archival software (e.g., SYMANTEC Enterprise Vault), e-discovery software (e.g., SYMANTEC Discovery Accelerator), classification software (e.g., SYMANTEC Automatic Classification Engine), compliance software (e.g., SYMANTEC Control Compliance Suite), content/record management software (e.g., DOCUMENTUM Content Server) and/or the like. In one embodiment, SYMANTEC Enterprise Vault Connectors specify various functions that may be used by the various software products to interact with the archive computer 106 (e.g., ingest the data items into the archive database 128, organize archived data items into a particular presentation format for legal compliance/reporting and/or the like).

For example, the Enterprise Content Management (ECM) API for Enterprise Vault may be used for ingesting files and emails into a repository, such as the archive database 128 while enabling management of such files and emails through various ECM software products (e.g., DOCUMENTUM Content Server, IBM DB2 Records Manager and/or the like). According to one embodiment, the migration module 118 invokes one or more ECM API functions in order to ingest files and/or emails into the archive database 128.

According to one or more embodiments, the migration module 118 and the mapping module 120 cooperate to examine the backup data 110 in order to select and apply the appropriate mapping technique to extract the data items. In one embodiment, the migration module 118 mounts the backup data 110 and uses the mapping module 120 to identify the type of backup (e.g., aggregate (database-level) backup, volume-level backup, mailbox-level backup, file-level backup and/or the like). In one embodiment, based on the format of the data items, the mapping module 120 selects an appropriate mapping technique to determine locations of the data items within the backup data 110 and generate a mapping indicating such locations. As mentioned above, the migration module 118 may communicate the mapping to the archive computer 106.

For example, the migration module 118 may determine that the backup data 110 is a mailbox-level backup, such as a brick-level MICROSOFT Exchange mailbox backup, because the backup data 110 includes one or more emails that are not organized in an aggregate email database. As another example, the mapping module 120 may determine that the backup data 110 is a database-level backup, such as a MICROSOFT Exchange database image backup, since the backup data 110 includes one or more databases in EDB or STM format and various log files. As yet another example, the mapping module 120 may determine that the backup data 110 is a virtual hard disk backup, such as a VMWARE virtual machine disk, because the backup data 110 includes one or more virtual disks in VMDK format.

According to various embodiments of the present invention, the migration module 118 utilizes the mapping generated by the mapping module 120 to extract one or more data items from the backup data 110. In one embodiment, as the backup data 110 is streamed from magnetic tape drives, the migration module 118 identifies and extracts the data items using the mapping. Furthermore, based on the mapping, the migration module 118 selects such data items by applying various criteria (e.g., type, content, size and/or the like) according to one embodiment. If the backup data 110 includes an aggregate data backup, the data items may be extracted directly from the backup data 110 (e.g., as streamed from the magnetic tape drives) using the mapping generated through a granular access technique (e.g., SYMANTEC Backup Exec Granular Restore Technology, NetBackup FlashBackup and/or the like). Alternatively, the backup data 110 (e.g., a backup image) may be copied to a disk-staging area (e.g., a separate directory on a hard disk) and then, the data items are extracted individually through the granular access technique.

According to various embodiments of the present invention, the migration module 118 communicates the extracted data items to an ingest interface generated by the ingest filter 130. In one embodiment, the migration module 118 invokes appropriate functions on such an ingest interface to archive the data items. For example, the migration module 118 may use the ingest interface to store the data items in the archive database 128, set a retention period, perform intelligent indexing to facilitate search and retrieval, classify the data items (e.g., as financial data, technical data and/or the like) and/or any other archival or management operation. In another embodiment, the migration module 118 may use the ingest interface (e.g., ECM API) to archive the data items through enterprise content/record management software as described above. Furthermore, the migration module 118 may use the interface to archive the mapping generated by the mapping module 120 according to one or more embodiments. For example, the locations of the data items may also indicate relationships between one or more data items, which may enhance the effectiveness of the archival software.

In one embodiment, the migration module 118 utilizes a granular restore technique to extract one or more emails from an image that includes a MICROSOFT Exchange Database (.EDB file). As an example, the migration module 118 uses the ingest interface to store the one or more emails in a table in the archive database 128. In one embodiment, archival software associated with the archive database 128 indexes the one or more emails to facilitate fast search and retrieval for E-discovery and/or legal compliance purposes. At a later date, a computing device may query the archive database 128 to retrieve emails according to one or more criteria, such as emails to/from the CEO. For example, compliance and/or content management software may access, manage and/or otherwise process the emails for various purposes as mentioned above.

As another example, the migration module 118 may extract one or more files (e.g., spreadsheets, databases, documents and/or the like) that contain financial data from a MICROSOFT SharePoint database image. For example, the mapping module 120 determines that the backup data 110 is an aggregate data backup of a MICROSOFT SharePoint Server because the backup data 110 includes one or more MICROSOFT Web Parts built on Windows SharePoint Services (WSS). The migration module 118 copies the MICROSOFT SharePoint database image to the disk-staging area and extracts the financial data (e.g., using a granular harvesting technique, such as BackupExec Granular Restore Option (GRO)). Subsequently, the migration module 118 uses the ingest interface to archive the financial data. For example, the financial data may be organized in a particular structure in order to comply with various laws and regulations. Furthermore, compliance software may access the archived financial data and create reports in a particular presentation format for submission to a court of law, a government agency, an administrative hearing and/or the like.

Figure 2:
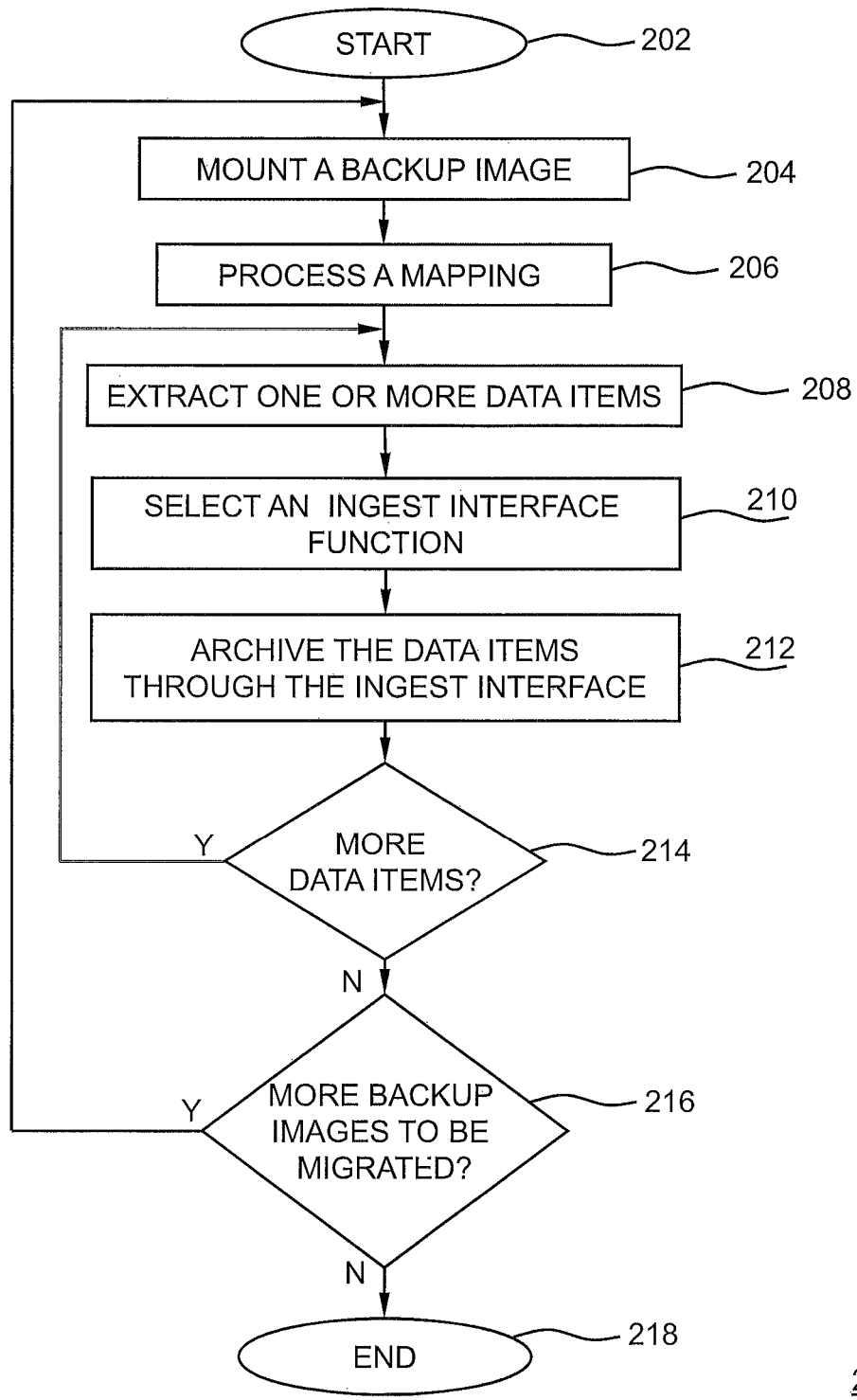
FIG. 2 is a flow diagram of a method for automatically archiving data items from a backup storage in accordance with one or more embodiments of the present invention.

FIG. 2 is a flow diagram of a method 200 for automatically archiving data items from a backup storage according to one embodiment. The method 200 starts at step 202 and proceeds to step 204, at which a backup image (e.g., the backup data 110 of FIG. 1) is mounted. In one embodiment, the backup image may be created by enterprise backup software during a backup process performed on one or more data items. In one embodiment, the mounted backup image is streamed from a magnetic tape drive as a backup data stream.

At step 206, a mapping of the data items is processed. In one embodiment, a granular access technique (e.g., BackupExec GRT) may be used to generate the mapping for the one or more data items within the backup image. In another embodiment, the mapping may be generated during the backup process (e.g., NetBackUp FlashBackup). At step 208, the one or more data items are extracted from the backup image. The step 208 is discussed further below for FIG. 3. At step 210, an ingest interface function for an archival system (e.g., the archive computer 106 and the archive database 128 of FIG. 1) is selected. At step 212, the one or more data items are archived through the ingest interface. In one embodiment, information indicating original locations of the one or more data items is obtained from the backup image and communicated to the archival system. As a result, functionality of the archival system is enhanced with knowledge of the original locations of the one or more data items within the backup image.

At step 214, a determination is made as to whether there are more data items in the backup image to be archived. If, it is determined that there are no more data items in the backup image to be archived (option "NO"), then the method 200 proceeds to step 216. If, at step 214 it is determined that there are more data items in the backup image to be archived (option "YES"), then the method 200 proceeds to step 204. At step 216, a determination is made as to whether there are more backup images to be migrated. If, it is determined that there are no more backup images to be migrated (option "NO"), then the method 200 proceeds to step 218. If, at step 214 it is determined that there are more backup images to be archived (option "YES"), then the method 200 proceeds to step 208. At step 218, the method 200 ends.

Figure 3:
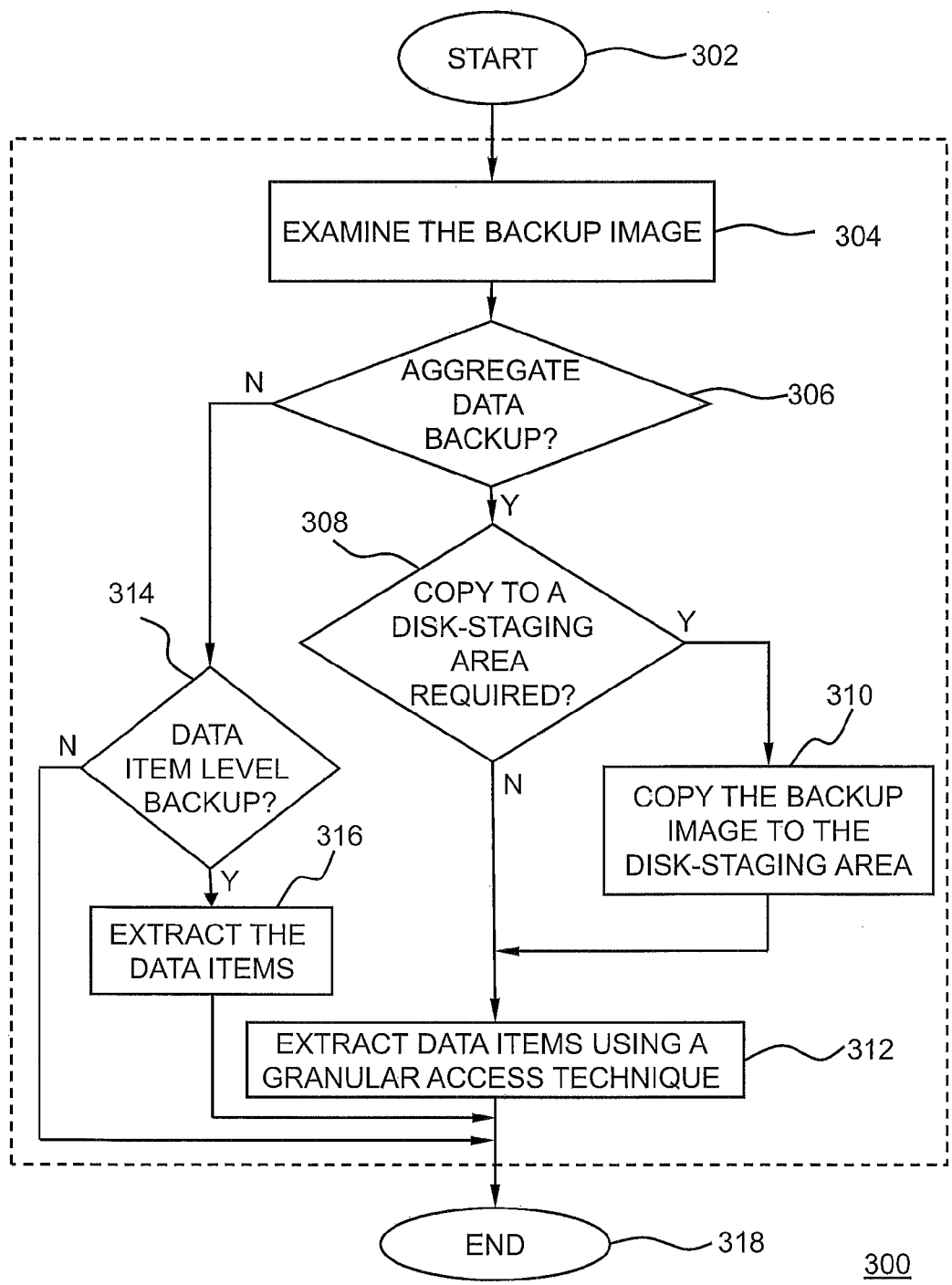
FIG. 3 is a flow diagram of a method for extracting data items in accordance with one or more embodiments of the present invention.

FIG. 3 is a flow diagram of a method 300 for extracting data items according to one embodiment. The method 300 starts at step 302 and proceeds to step 304, at which the backup image (e.g., the backup data 110 of FIG. 1) is examined. In one embodiment, the backup image may include various types of data items (e.g., emails, word documents, spreadsheets and/or the like) organized in an aggregate data format (e.g., MICROSOFT Exchange databases, SharePoint images and/or the like).

At step 306, a determination is made as to whether the backup image is an aggregate data backup. If, it is determined that the backup image is an aggregate data backup (option "YES"), then the method 300 proceeds to step 308. At step 308, a determination is made as to whether copying the backup image to the disk-staging area is required. If the backup image is required to be copied to the disk-staging area, the method 300 proceeds to step 310. If the backup image is not required to be copied to the disk-staging area, the method 300 proceeds to step 312. For example, if individual data items may be directly extracted from the tape media, then the backup image is not required to be copied to the disk-staging area. As another example, if the backup image already resides on a random access storage media, then the backup image is not required to be copied to the disk-staging area. At step 310, the backup image is copied to a disk-staging (e.g., a separate directory) area. At step 312, the data items are extracted from the backup image using a granular access technique (e.g., SYMANTEC Backup Exec Granular Restore Technology, NetBackup FlashBackup and/or the like). The method 300 proceeds to step 320, where the method 300 ends.

If, at step 306 it is determined that the backup data is not an aggregate data backup (option "NO"), then the method 300 proceeds to step 314. At step 314, a determination is made as to whether the backup data is a data item-level backup (e.g., a file-level backup, a mailbox-level backup and/or the like). If, it is determined that the backup data is a data item-level backup (option "YES"), then the method 300 proceeds to step 316. At step 316, the data items are extracted individually. The method 300 proceeds to step 318, where the method 300 ends. If, at step 314, it is determined that the backup data is not a data item-level backup (option "NO"), then the method 300 proceeds to step 318. At step 318, the method 300 ends.

Thus, various embodiments of the present invention have been provided. The inventive methods and apparatus may advantageously provide significant reduction of data migration time. The inventive apparatus advantageously minimizes the space required to store data. In another embodiment, the inventive apparatus may be utilized to provide storage efficiency. According to various embodiments of the present invention, the inventive methods and apparatus may advantageously be utilized to provide data discovery and/or legal compliance.

While the foregoing is directed to embodiments of the present invention, other and further embodiments of the invention may be devised without departing from the basic scope thereof, and the scope thereof is determined by the claims that follow.

The invention claimed is:

1. A method comprising:
  selecting one or more data items to be extracted from a backup image, wherein
    the backup image is stored in a plurality of units of magnetic tape storage,
    the selecting is based on criteria, and
    the criteria comprise at least one of
      a custodian of the one or more data items, or
      content of the one or more data items;

identifying the one or more data items in a mapping, wherein
the mapping identifies
a target unit of magnetic tape storage among the plurality of units of magnetic tape storage, wherein the target unit of magnetic tape storage comprises the one or more data items, and
a respective location in the target unit of magnetic tape storage for each of the one or more data items; and
extracting the one or more data items from the backup image, wherein
the extracting uses the mapping,
the extracting produces one or more extracted data items, and
the extracting is performed without restoring the one or more data items;
migrating the one or more extracted data items to an ingest interface; and
archiving the one or more extracted data items into an archive database, wherein
the ingest interface is configured to perform the archiving.

2. The method of claim 1, further comprising:
generating the mapping, wherein
the generating is based on the backup image, and
the mapping is generated after the backup image is created.

3. The method of claim 1, wherein
the criteria further comprises at least one of
a data item type, and
a data item size.

4. The method of claim 1, further comprising:
organizing the one or more extracted data items in a particular structure in the archive database, wherein
the particular structure complies with a specific legal regulation.

5. The method of claim 1, wherein
the ingest interface is further configured to
set a retention period for the one or more extracted data items,
perform intelligent indexing for the one or more extracted data items,
classify the one or more extracted data items, and
archive the mapping.

6. The method of claim 1, further comprising
determining whether the backup image is an aggregate data backup,
determining whether copying the backup image to a disk staging area is required, and
copying the backup image to the disk staging area, wherein
the copying is performed in response to
determining that the backup image is an aggregate data backup, and
determining that copying the backup image to the disk staging area is required.

7. The method of claim 1, wherein
the extracting uses a granular access technique.

8. A non-transitory computer readable storage medium configured to store program instructions that, when executed on a processor, are configured to cause the processor to perform a method comprising:
selecting one or more data items to be extracted from a backup image, wherein
the backup image is stored in a plurality of units of magnetic tape storage,
the selecting is based on criteria, and
the criteria comprises at least one of
a custodian of the one or more data items, or
content of the one or more data items;
identifying the one or more data items in a mapping, wherein
the mapping is configured to identify
a target unit of magnetic tape storage among the plurality of units of magnetic tape storage, wherein the target unit of magnetic tape storage comprises the one or more data items, and
a respective location in the target unit of magnetic tape storage for each of the one or more data items; and
extracting the one or more data items from the backup image, wherein the extracting uses the mapping,
the extracting produces one or more extracted data items, and
the extracting is performed without restoring the one or more data items;
migrating the one or more extracted data items to an ingest interface; and
archiving the one or more extracted data items into an archive database,
wherein
the ingest interface is configured to perform the archiving.

9. The non-transitory computer readable storage medium of claim 8, wherein the method further comprises:
generating the mapping, wherein
the generating is based on the backup image, and
the mapping is generated after the backup image is created.

10. The non-transitory computer readable storage medium of claim 8, wherein
the criteria further comprises at least one of
a data item type, and
a data item size.

11. The non-transitory computer readable storage medium of claim 8, wherein the method further comprises:
organizing the one or more extracted data items in a particular structure in the archive database, wherein
the particular structure complies with a specific legal regulation.

12. The non-transitory computer readable storage medium of claim 8, wherein
the ingest interface is further configured to
set a retention period for the one or more extracted data items,
perform intelligent indexing for the one or more extracted data items,
classify the one or more extracted data items, and
archive the mapping.

13. An apparatus comprising:
a processor; and
a memory coupled to the processor and configured to store instructions executable by the processor, the instructions configured to select one or more data items to be extracted from a backup image,
wherein
the backup image is stored in a plurality of units of magnetic tape storage,
selection of the one or more data items is based on criteria, and
the criteria comprises at least one of
a custodian of the one or more data items, or
content of the one or more data items;

identify the one or more data items in a mapping, wherein
  the mapping is configured to identify
    a target unit of magnetic tape storage among the plurality of units of magnetic tape storage, wherein
      the target unit of magnetic tape storage comprises the one or more data items, and
    a respective location in the target unit of magnetic tape storage for each of the one or more data items; and
extract the one or more data items from the backup image, wherein
  extraction of the one or more data items uses the mapping,
  the extraction of the one or more data items produces one or more extracted data items, and
  the extraction is performed without restoration of the one or more data items;
migrate the one or more extracted data items to an ingest interface; and
archive the one or more extracted data items into an archive database, wherein
  the ingest interface is configured to archive the one or more extracted data items into the archive database.

14. The apparatus of claim 13, wherein the instructions are further configured to
  generate the mapping, wherein
    generation of the mapping is based on the backup image, and
    the mapping is generated after the backup image is created.

15. The apparatus of claim 13, wherein
the criteria further comprises at least one of
  a data item type, and
  a data item size.

16. The apparatus of claim 13, wherein the instructions are further configured to
  organize the one or more extracted data items in a particular structure in the archive database, wherein
    the particular structure complies with a specific legal regulation.

17. The apparatus of claim 13, wherein
the ingest interface is further configured to
  set a retention period for the one or more extracted data items,
  perform intelligent indexing for the one or more extracted data items,
  classify the one or more extracted data items, and
  archive the mapping.

\* \* \* \* \*